United States Patent [19]
Clark et al.

[11] Patent Number: 5,978,335
[45] Date of Patent: Nov. 2, 1999

[54] INTEGRATED CALIBRATION APPARATUS FOR A MULTI-MODE INFORMATION STORAGE SYSTEM

[76] Inventors: Alan Robert Clark, 11835 N. Gray Eagle Ave., Tucson, Ariz. 85737; Robert Allen Hutchins, 9797 E. Nicaragua Pl., Tucson, Ariz. 95730; Glen Alan Jaquette, 5270 N. Rocky Ridge Pl., Tucson, Ariz. 85715

[21] Appl. No.: 08/672,862

[22] Filed: Jun. 28, 1996

[51] Int. Cl.⁶ ........................................ G11B 7/00
[52] U.S. Cl. ................................................ 369/54
[58] Field of Search ............................ 369/54, 116, 58, 369/59, 124, 46.31

[56] References Cited

U.S. PATENT DOCUMENTS

| | | |
|---|---|---|
| 4,506,309 | 3/1985 | Joannou et al. . |
| 4,907,212 | 3/1990 | Pharris et al. . |
| 5,050,156 | 9/1991 | Barton ........................................ 369/54 |
| 5,121,260 | 6/1992 | Asakawa et al. . |
| 5,231,625 | 7/1993 | Hokozono et al. . |
| 5,268,893 | 12/1993 | Call et al. ................................ 369/54 |
| 5,303,217 | 4/1994 | Bakx et al. ............................... 369/54 |
| 5,341,360 | 8/1994 | Johann et al. . |
| 5,353,270 | 10/1994 | Ilmura . |
| 5,392,273 | 2/1995 | Masaki et al. . |
| 5,602,814 | 2/1997 | Jaquette et al. . |
| 5,617,401 | 4/1997 | Hurst, Jr. ................................ 369/58 |

FOREIGN PATENT DOCUMENTS

| | | |
|---|---|---|
| 0393001A2 | 10/1990 | European Pat. Off. . |
| 0442566A1 | 8/1991 | European Pat. Off. . |
| 6-259769 | 9/1994 | Japan . |
| 6-349066 | 12/1994 | Japan . |

*Primary Examiner*—Thang V. Tran

[57] ABSTRACT

An integrated calibration apparatus operates in multiple calibration modes of a multi-mode information storage system such as an optical disk drive to calibrate the drive in the multiple write modes. An event processing and measurement circuit is configurable in multiple configurations that each correspond to a different calibration measurement. Each configuration concurrently measures one or more parameters of readback data written to an optical disk by the optical disk drive operating in a particular write mode. A qualification circuit selects valid measurements for two different parameters or for two different qualification of the same parameter. A summation circuit sums valid measurements of each parameter measured and counts the number of measurements summed for each parameter. The calibration apparatus calculates average values for the measured parameters from the sums and counts, and then calibrates the multi-mode optical disk drive for its current write mode based on the average values.

19 Claims, 9 Drawing Sheets

INTEGRATED CALIBRATION APPARATUS FOR A MULTI-MODE INFORMATION STORAGE SYSTEM

BACKGROUND OF THE INVENTION

1. Technical Field

The present invention relates in general to a calibration apparatus for information storage systems, and in particular to a calibration apparatus for an information storage system that writes in multiple modes.

2. Description of the Related Art

Optical disk drives must be calibrated in order to maximize the signal-to-noise ratio (SNR) of the optical disk drive, among other specifications. Typically, the calibration system will set the laser write power and methodology to an optimum level for a given read head and optical disk media to maximize the SNR. Since this optimal level or operating point may vary with different optical drives and disk media, the write conditions of the optical disk must be optimized for each drive/media combination.

Because many drives can write data in multiple modes (a multi-mode drive) and because different types of information media can be loaded into the disk drive, the calibration cannot be fixed on the manufacturing line since the final drive/media combination is unknown. For example, a multi-mode drive may write to an optical disk using either Pulse Position Modulation (PPM) or Pulse Width Modulation (PWM) records, and either one of these writing modes may be used with any type of optical disk media, including rewritable media types such as Phase Change (PC) or, Magneto-Optical (MO), and Write Once Read Many (WORM). Therefore, in order to set the optical disk drive to the optimal write operating level and methodology, a calibration device is built into each optical disk drive that performs measurements on the disk drive readback signal to determine the performance of the disk drive once the configuration has been set. These measurements are then processed by the controlling microprocessor to adjust the write power and methodology, to achieve optimum performance of the optical disk drive. This calibration can be performed by the hardware every time a new disk is inserted in the drive or a new write mode is selected. Alternately, calibration can be performed as part of write Error Recovery Procedures (ERPs). Because there are multiple drive/media combinations and multiple write modes, different calibration parameters typically must be measured for each mode of operation and combination of the optical disk drive.

In order to support calibration in any of the various modes of operation, an optical disk drive may require a number of calibration devices that each measure a different parameter of the readback data. Each calibration device goes through a cycle of reading a test pattern or data that is first written to the disk and then measuring the average value of a particular parameter. If a given calibration mode requires measurement of multiple parameters, a number of these calibration cycles are required to complete the calibration measurements.

As will be appreciated, including many calibration devices in a single disk drive to support each of the multiple calibrations adds a significant amount of circuitry, consumes large amounts of power, and increases the cost of the optical disk or other type of drive. Moreover, a calibration requiring the measurement of multiple parameters typically will require multiple calibration cycles. What is needed is a calibration apparatus for an multi-mode drive that doesn't have substantially increased calibration hardware, but that can perform the various measurements required for all calibration modes of a multi-mode drive. Further, it would be desirable for such a calibration device to perform all calibration measurements for at least some calibration modes in a single calibration cycle. Such an apparatus would substantially reduce the cost and increase the speed of calibration for a multi-mode drive.

SUMMARY OF THE INVENTION

According to the present invention, a calibration apparatus operates in multiple calibration modes to calibrate a multi-mode optical disk drive. The calibration apparatus includes a configurable event processing and measurement circuit that has a plurality of diverse configurations that each correspond to a different calibration measurement. Each measurement is of a selected one or more of a plurality of possible parameters of the readback data such that the parameters measured will provide information for calibration of the optical disk drive operating in a particular write mode and read setting. A summation circuit sums selected measurements of each parameter measured by the event processing and measurement circuit and counts the number of measurements summed for each parameter. The above as well as additional objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The preferred embodiment of the present invention provides a calibration device that is configurable in four calibration modes, each mode measuring one or more parameters of a readback signal of a multi-mode optical disk drive in a single calibration cycle. The calibration modes are a mark-space mode for measuring mark and space lengths, a peak-to-peak mode for measuring peak-to-peak amplitude of the readback signal, a phase-lock-loop (PLL) phase-error mode for measuring the phase-error jitter and SNR, and a tracking threshold mode for measuring the tracking threshold for at least two different data patterns. Additionally, the circuit allows the gain and/or the SNR in the read operation to be tested and appropriately modified. All modes are concurrently available to be selected by the controlling microprocessor for calibration of the optical disk drive to the optimum read or write parameters for the particular drive operating mode and optical disk media. In a preferred embodiment, the optical disk drive can be calibrated for a write process using either PPM or PWM, and for any type of optical media, including PC, MO and WORM. Also, any one of the available measurements can be selected to perform a Medium Scan function to determine if the disk media has been written. This is particularly useful in WORM types of media where the drive must determine the first available unwritten sector when writing to the disk.

Figure 1:
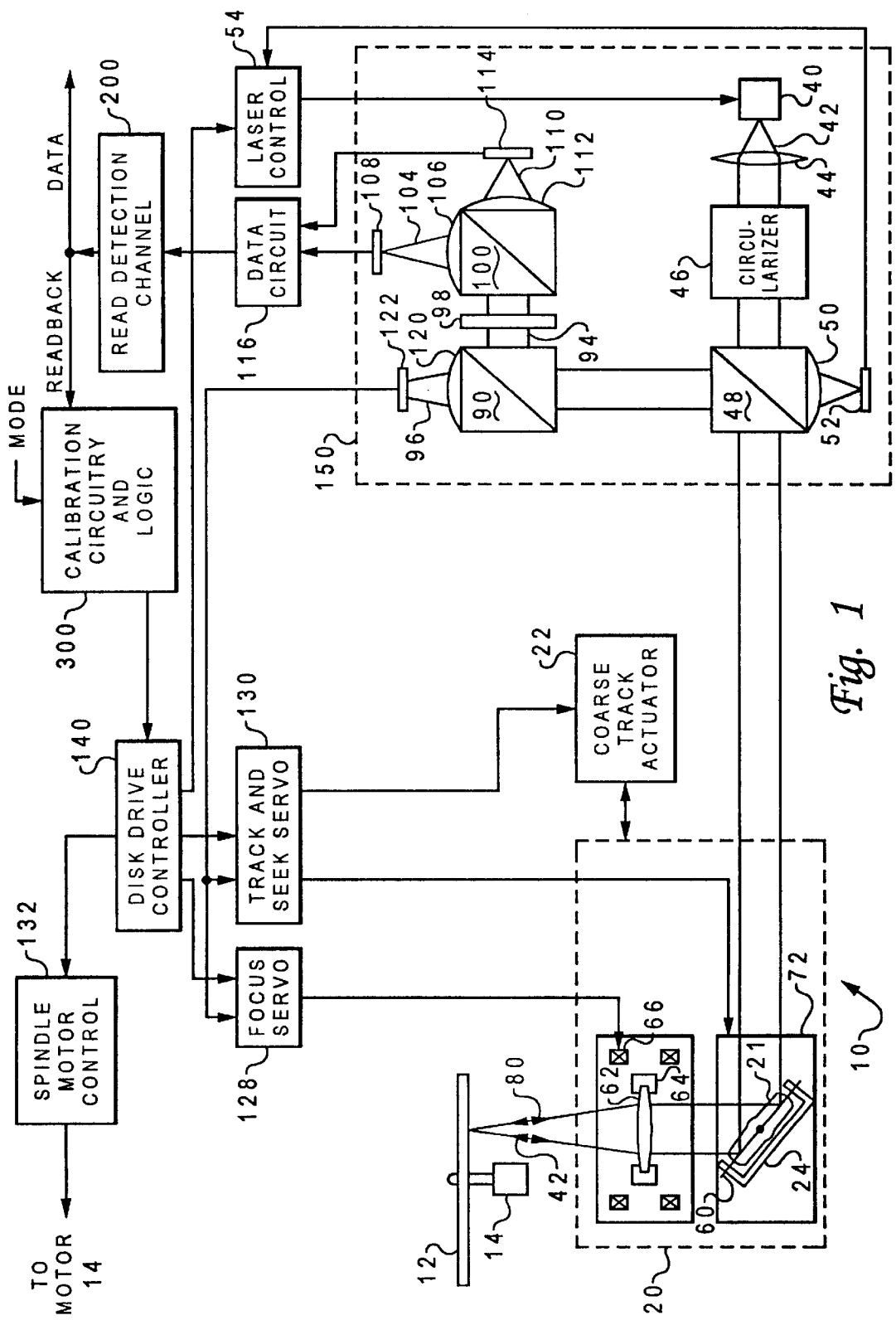
FIG. 1 depicts the optical disk drive of a preferred embodiment of the present invention.

With reference now to the figures and in particular with reference to FIG. 1, there is depicted a schematic diagram of an optical disk drive system according to a preferred embodiment of the present invention. Although the present invention is described with respect to an embodiment for an optical disk drive, those skilled in the art will appreciate that the present invention can be embodied in a tape drive system, a magneto-optical system, or other types of information storage and retrieval systems and information media, and that the scope of the present invention extends to such embodiments. System 10 has optical data stored in optical disk 12, which is typically a disk having concentric or spiral data tracks. Disk 12 is mounted to a spindle motor 14. An optical head 20 is positioned below disk 12 and is moved in a radial direction relative to disk 12 by a coarse track actuator 22.

A fixed optical element (FOE) system 150 comprises laser 40, lens 44, circularizer 46, beam splitter 48, lens 50, detector 52, beam splitter 90, waveplate 98, beam splitter 100, lenses 106, 112, 120 and detectors 108, 114 and 122. A laser 40, which may be a laser diode, produces a polarized light beam 42. Light beam 42 is collimated by a lens 44 and circularized by a circularizer 46 (prism). Beam 42 passes to a beam splitter 48, and a portion of beam 42 is reflected towards a lens 50, which focuses a light to a power monitor optical detector 52. Detector 52 is connected to a laser control 54 to provide a monitor power signal, which is used to adjust the power of laser 40 as appropriate.

The remaining portion of beam 42 passes through beam splitter 48 to a mirror 60 mounted to fine track actuator 72, which includes rotor 21 and rotor mount 24. Fine track actuator 72 rotates mirror 60 small distances, which in turn moves light beam 42 in a radial direction on the surface of disk 12 for purposes of maintaining light beam 42 on the proper track position on disk 12. Mirror 60 reflects the light toward an objective lens 62 mounted in a lens holder 64, which may be held laterally to disk 12 by focus actuator 66 in order to focus light beam 42 on the proper track position on disk 12. A light beam 80 is reflected from the disk 12, is passed through lens 62 and is reflected by mirror 60. A portion of the light beam 80 is then reflected by beam splitter 48 to a beam splitter 90. Beam splitter 90 divides the beam 80 into a data beam 94 and a servo beam 96.

Servo beam 96 is focussed by a lens 120 onto a segmented optical detector 122, such as a spot size measuring detector as is known in the art. A focus servo 128 is connected to detector 122 and motor 66 to control motor 66 to adjust the position of lens 62 as appropriate in order to maintain proper focus. A track and seek servo 130 is connected to detector 122 and actuators 22 and 72. Servo 130 causes actuator 22 to adjust the position of head 20 as appropriate to seek desired tracks on disk 12, and causes actuator 72 to rotate mirror 60 as appropriate to maintain proper tracking position once the appropriate track is reached. A spindle motor control 132 is connected to motor 14. A disk drive controller 140 provides overall control for servo 128 and 130, as well as spindle motor 14, and laser control 54.

Data beam 94 passes through a half waveplate 98 to a polarizing beam splitter 100, which divides beam 94 into two orthogonal polarization components. A first polarization component beam 104 is focussed by a lens 106 to a data optical detector 108. A second polarization component beam 110 is focussed by a lens 112 to a data optical detector 114. Data circuit 116 is connected to detectors 108 and 114. For MO media, this circuit generates a data signal responsive to the differences in the amount of light detected at detectors 108 and 114, which is representative of the data recorded on disk 12, and converts the analog input signal into a digital waveform representation utilizing any useful manner known in the art. The digital waveform representation output of data circuit 116 forms the input data stream of read detection channel 200.

During a read operation of MO media, controller 140 causes laser control 54 to energize laser 40 to generate a low power polarized beam 42 which is not powerful enough to heat the disk 12 above its Curie temperature. Phase changes in the reflected light are detected by detectors 108 and 114 and passed to data circuit 116, which outputs a digitized data signal representative of the recorded data. During a write operation, controller 140 causes laser control 54 to energize laser 40 to provide a high power polarized beam 42 that is powerful enough to form marks (MO) or pits (ablative WORM) on the disk 12. The laser 40 is pulsed responsive to the data to be recorded on the disk, resulting in marks and spaces on the surface of the disk.

In a preferred embodiment, optical disk drive 10 is a multi-mode drive that can write data to an optical disk in any one of a number of write encodings. The desired write method and laser power levels are selected and controlled by disk drive controller 140, usually as a function of the type of data storage medium and data density. Typically, data stored on an optical disk is encoded utilizing either Pulse-Position Modulation (PPM) or Pulse-Width Modulation (PWM). PPM data recording comprises a well known recording method in which the presence of a peak in a data waveform is interpreted as a selected one of a binary 1 or binary 0. In general, peaks within an input data waveform are detected during time intervals at which the derivative of the data waveform has a value of zero and the amplitude of the data waveform exceeds a predetermined threshold value. PPM data recording was widely utilized in the previous generation of optical recording media, including both single-speed (1x) and double-speed (2x) optical disks. PWM data recording is a data recording method in which the presence of a signal transition in a bit cell time interval indicates a selected one of a binary 1 or a binary 0 and the absence of a signal transition in a bit cell time interval indicates the other of the two possible binary states. Because both the presence and absence of a signal transition in a bit cell time interval carries data information, PWM (as well as PPM) data recording requires that a detection clock be provided to accurately define the bit cell time intervals. This detection clock signal must be synchronized with the bit cell time interval utilized when the PWM-encoded data was originally written on the optical media in order to accurately reproduce the original data. PWM data recording is utilized in the current generation of optical recording media, including 4x optical disks and Digital Video Disk (DVD) ROM and DVD RAM.

Figure 2:
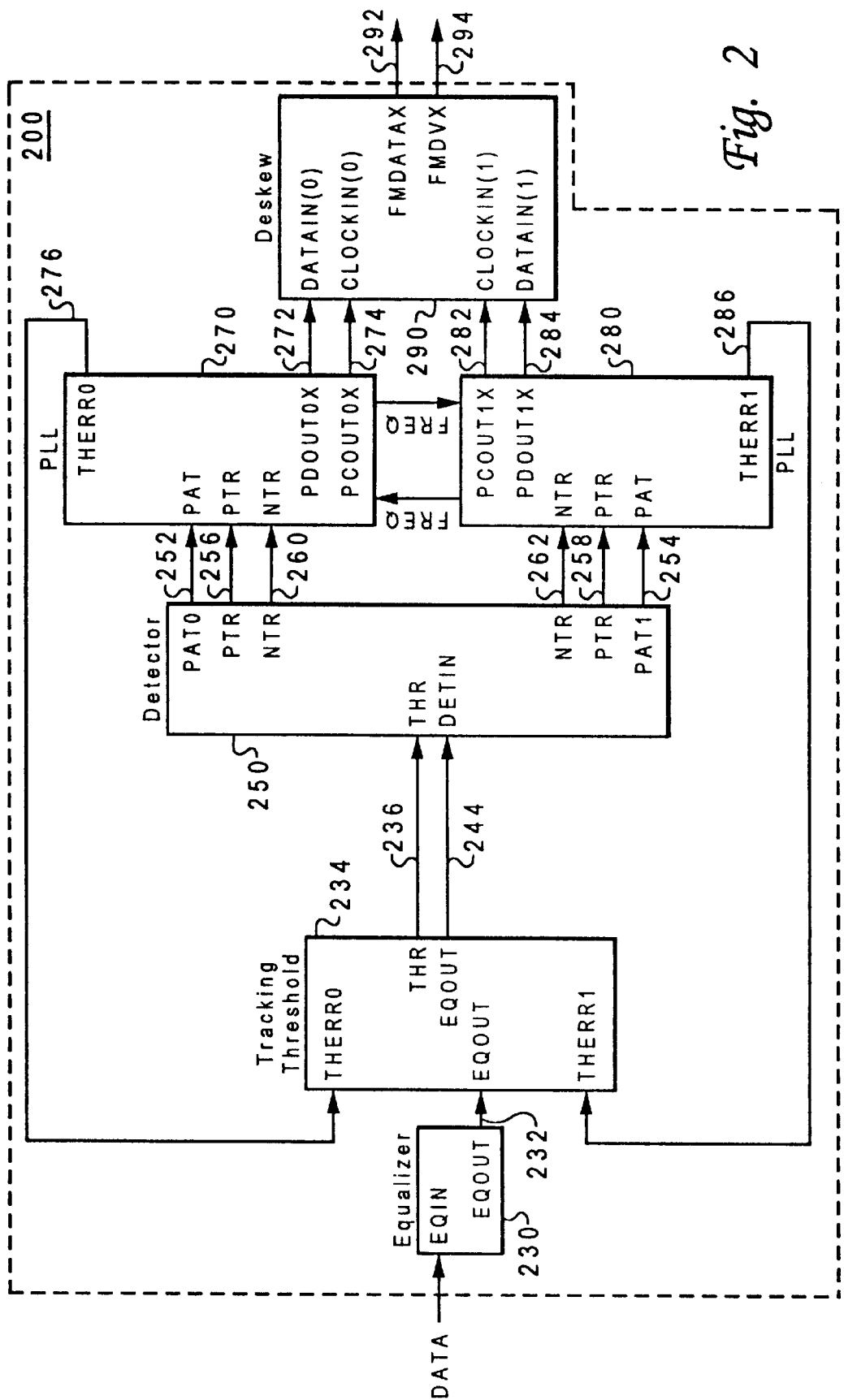
FIG. 2 illustrates a block diagram representation of a read detection channel in the optical disk drive of a preferred embodiment of the present invention.

With reference now to FIG. 2, there is illustrated a block diagram representation of read detection channel 200 in a preferred embodiment of the present invention. Read detection channel 200 is preferably implemented utilizing fully digital modular circuitry that can recover data stored on an optical disk utilizing any one of multiple encoding methods. The illustrated configuration of read detection channel 200 is a dual phase adaptive threshold (DPAT) channel for decoding PWM and PPM signals, which utilizes phase feedback from dual phase-locked loops (PLLs) to maintain a reference threshold level near the optimum detection level for the input signal.

As depicted, read detection channel 200 includes equalizer 230, tracking threshold circuit 234, detector 250, dual phase-locked loops (PLLs) 270 and 280, and deskew (merging) circuit 290. The digital waveform output of data circuit 116 (FIG. 1) that forms the input data stream of read detection channel 200 is received by equalizer 230. Equalizer 230 filters the input data stream utilizing a finite impulse response (FIR) digital filter, for example. The filtered digital waveform representation is then passed to tracking threshold circuit 234 as equalizer output (EQOUT) signal 232.

Tracking threshold circuit 234 generates a threshold (THR) signal 236 utilized by detector 250 to detect data transitions within the input data stream. THR signal 236 is an estimate of an optimum detection level that is substantially near a mid-point between the positive and negative peaks of EQOUT signal 232. Utilizing THR signal 236 generated by tracking threshold circuit 234, detector 250 can identify transitions of the input data stream and accordingly detect data bits encoded on the disk. Alternatively, tracking threshold circuit 234 can estimate the threshold centerline of the input data stream based upon both EQOUT signal 232 and threshold error (THERR) signals 276 and 286, which specify a phase difference between EQOUT signal 232 and data output signals 272 and 284, respectively.

Detector 250 utilizes THR signal 236 to estimate the location of a transition or zero-crossing within the signal received at detector input 244. For example, for detection of PWM data at a given sample time, if the data sample at detector input 244 has a value greater than the value of THR signal 236 and the previous data sample has a value less than that of THR signal 236, or conversely, if the data sample at detector input 44 has a value less than that of THR signal 236 and the previous data sample has a value greater than that of THR signal 236, detector 250 indicates that a zero-crossing has occurred by generating an estimation of where within a sample cell of a sampling clock the transition occurred by provided to dual PLLs 270 and 280 pulse arrival time (PAT) signals 252 and 258. In addition, detector 250 generates qualifiers to PLLs 270 and 280 indicating whether a transition comprises the rising or falling edge of a pulse by asserting either positive transition (PTR) signals 256 and 258 or negative transition (NTR) signals 260 and 262, respectively.

As will be appreciated, recovery of the bit stream from the data track requires recovery of the clock used to write the bit stream. This sampling clock should correspond in frequency to the presentation rate for bit cell locations and physically altered features of the tracks to produce signal transitions centered within a sample cell of the clock. However, a number of factors can cause the bit as written to the media to be shifted from its ideal position, resulting in frequency or phase shifts in readback signal generated by the read back transducer. The PLL of the read channel regenerates a synchronous data clock waveform in response to the flow of self-clocking signal waveform peaks received from the optical transition detector in the read channel and is broken down into sample cells that attempt to track the actual bit cells.

In the DPAT configuration of read detection channel 200, PLL 270 is designated to process positive transitions and PLL 280 is designated to process negative transitions. Data output signals 272 and 284 are associated with clock output signals 274 and 282, respectively, which provide a data valid signal for every bit cell in data output signals 272 and 284. The outputs of PLLs 270 and 280 further include threshold error (THERR) signals 276 and 286, which comprise phase error signals that are utilized by tracking threshold circuit 234 to lock onto the correct centerline threshold value. Deskew logic 290 merges data output signals 272 and 284 and clock output signals 274 and 282 to obtain output data stream (FMDATAX) 292 and data valid signal (FMDVX) signal 294. Output data stream 292 and data valid signal 294 are sent to a well-known signal formatter (not illustrated), which strips non-data information such as sector information, burst fields, and synch characters from output data stream 92 in order to recover the original data stored within optical disk 12.

Figure 3:
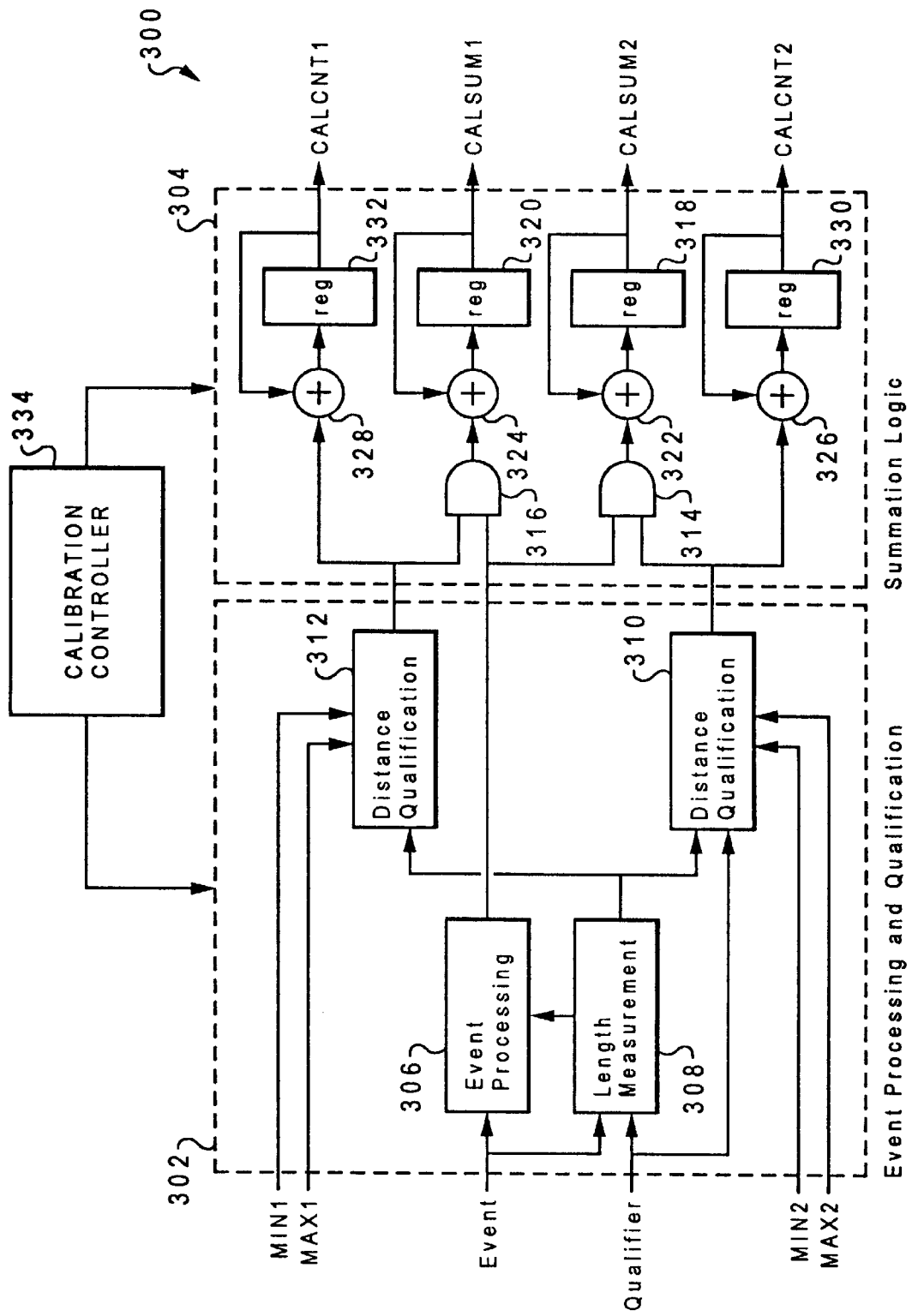
FIG. 3 shows a block diagram of the calibration circuitry and logic, according to a preferred embodiment of the present invention.

With reference now to FIG. 3, there is shown a schematic block diagram of the calibration logic and circuitry according to a preferred embodiment of the present invention. The calibration logic architecture 300 may be logically divided into event processing and qualification logic 302, calibration controller 334 and summation logic 304. Event processing and qualification logic 302 receives input data (which is comprised of events and qualifiers) from read detection channel 200. Data is processed by event processing 306 and length measurement 308 to obtain selected measurements required for calibration of the optical disk drive operating in a particular read and/or write mode. Each measurement is then qualified in qualification circuitry 310, 312 by comparing the measurement produced by length measurement circuitry 308 with programmed input minimum and maximum levels and producing a qualification signal if the measurement is between the minimum and maximum levels. A calibration controller 334 or disk drive controller 140 sets the minimum level (MIN1, MIN2) of the measurement and the maximum level (MAX1, MAX2) of the measurement that would qualify a particular measurement as a valid measurement to be used in calibrating the optical disk drive in a particular calibration mode. The separate settings for qualification circuitry 310 and 312 allows two separate measurements of the same parameter or two different parameters to be qualified simultaneously.

Qualified measurements are summed by summation logic 304 to enable calculation of the average value for the selected parameter. A measurement from event processing 306 or length measurement 308 is logically ANDed in ANDgates 314, 316 with the output of qualification circuitry 310 and 312, respectively. If qualified by either qualification circuitry 310 or 312, the measurement is stored in register 318 or register 320, respectively. Thereafter, as selected measurements are qualified, those measurements are summed by adders 322, 324 with the previous accumulation of measurements being stored in registers 318, 320. The accumulated sum of measurements stored in sum registers 318, 320 are output as calibration summation signals CALSUM2 and CALSUM1, respectively. In addition, as each measurement is qualified by qualification circuitry 310, 312, the binary qualification signal produced is input into adders 326 and 328, respectively. In a preferred embodiment, a qualification signal indicating a valid measurement is a binary "1". Thus, adders 326, 328 add the "1" qualification signal to the calibration count stored in sum registers 330 and 332, respectively, upon a qualified measurement being accumulated in the sum stored in registers 318, 320. The output calibration count signals CALCNT2 and CALCNT1 that indicate the total count are output from count registers 330 and 332, respectively. Thus, CALCNT1 and CALCNT2 show the number of measurements taken to produce the summed measurements CALSUM1 and CALSUM2, respectively. Because summation logic 304 provides two sets of accumulators and counters, pairs of qualified measurements in certain calibration modes can be taken simultaneously by the calibration logic architecture 300. For example, mark and space lengths or average ID amplitude and data amplitude can be measured and then summed by summation logic concurrently.

As will now be appreciated, summation logic 304 is used to accumulate a sum of the qualified measurements for one or two parameters and to count the number of qualified measurements that form the sum (i.e. a count of the number of times a valid measurement occurred). These two stored values for each parameter can then be used by the calibration controller 334 or disk drive controller 140 to determine an average value of the measurements.

Figure 4:
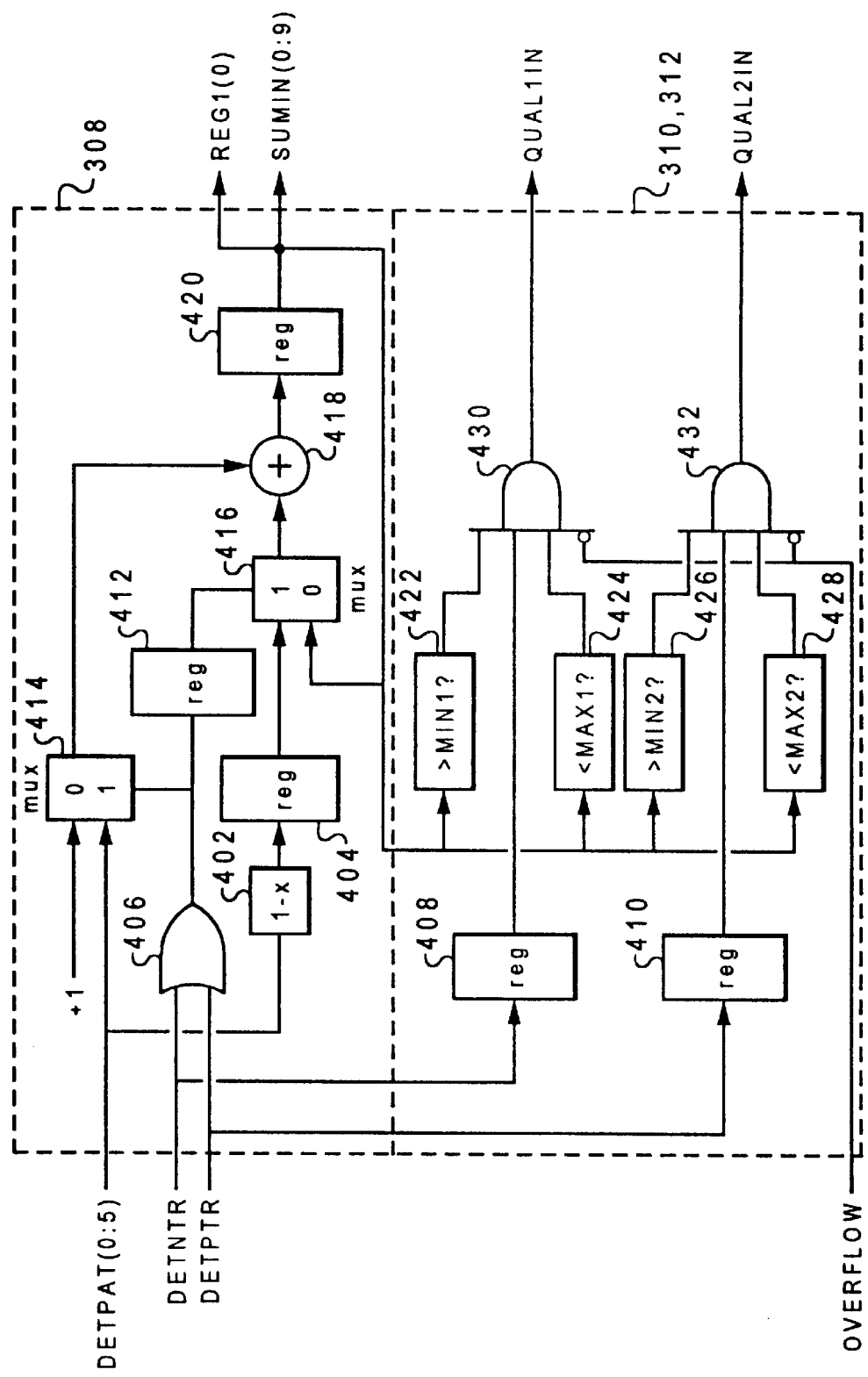
FIG. 4 is a schematic block diagram of the event processing and qualification circuitry configured for performing a Mark/Space measurement, in accordance with a preferred embodiment of the present invention.

With reference now to FIG. 4, there is shown a schematic block diagram of the components of event processing and qualification circuitry 302 for performing a Mark/Space measurement for calibration in a PWM, in accordance with a preferred embodiment of the present invention. The Mark/Space measurement measures the average mark length and average space length of data tracks on an optical disk encoded in PWM. Typically, these data tracks will be test tracks written to the optical disk at the beginning of the calibration cycle to be read back and measured. When configured for a Mark/Space measurement, the input event processed by the length measurement circuitry 308 is the signal transition arrival time of a signal transition received from the optical detector. This signal is generated by read detection channel 200 as the Detector Pulse Arrival Time (DETPAT (0:5)) and is received as an input event along with either a detector negative transition (DETNTR) or a detector positive transition (DETPTR) bit indicating whether the transition was a negative transition or a positive transition. Therefore, when DETNTR is active, the DETPAT data contains the position of a negative transition within a bit cell of the data stream, and similarly, DETPTR denotes a positive transition within a particular bit cell of the data stream. In the preferred system of FIG. 4, measurement of a mark width always starts with a positive transition (DETPTR) and ends with a negative transition (DETNTR). Likewise, a space measurement always begins with a negative transition (DETNTR) and ends with a positive transition (DETPTR).

Figure 5:
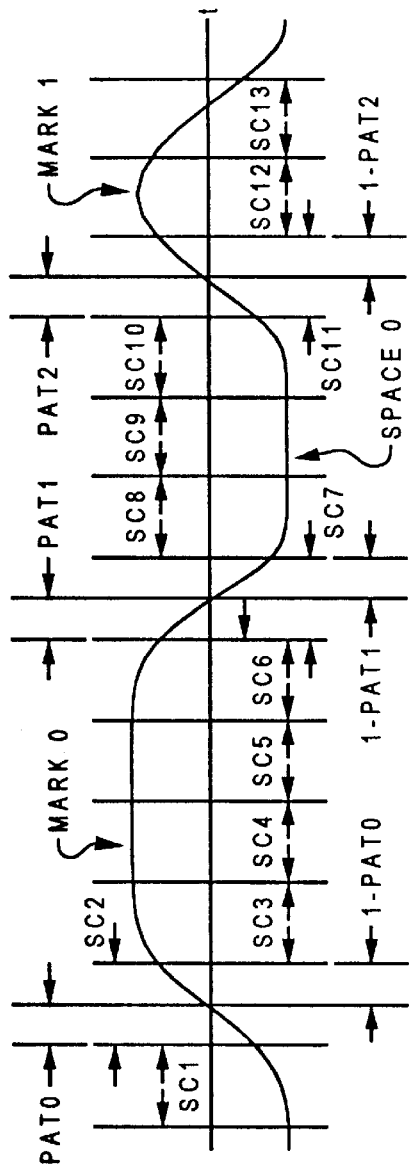
FIG. 5 shows an example of the mark and space lengths for a read data channel output written to the optical disk using PWM.

This is illustrated in FIG. 5, which shows an example of a read data channel output having a first mark (MARK0), a first space (SPACE0), and a second mark (MARK1) that are the result of readback data written to the optical disk using PWM. MARK0 begins with the positive transition detected during the second sample cell (SC2). The Pulse Arrival Time (PAT) of the positive transition is measured as the time after the beginning of the sample cell when the positive transition signal reaches a threshold level. As shown in FIG. 5, the PAT for MARK0 is indicated as PAT0. If the PAT is measured in a unit of time equal to the time period of a sample cell, the time from the pulse arrival until the end of the sample cell can be calculated as 1−PAT. From this, given the speed at which the optical disk is spinning, the length of a mark and the length of a space can be calculated based on the time the read signal remains above and below a threshold level, respectively. As seen in the example of FIG. 5, the length of MARK0=(1−PAT0)+4+PAT1 Sample-Cell-Lengths (SCL), wherein a SCL is equal to the distance the read laser travels along the optical disk track during a sample cell period. It will be appreciated that (1−PAT0) accounts for the time the signal transitions to above the threshold during SC2, PAT1 accounts for the time the signal remains above the threshold during SC7, and "4" accounts for SC3–SC6. Similarly, the length of SPACE0=(1−PAT1)+3+PAT2 SCL, and the length of MARK1=(1−PAT2)+1+PAT3 SCL.

Referring back to FIG. 4, when performing a mark measurement, the process begins with the arrival of DETPTR, which signals that DETPAT (0:5) contains the position of a positive transition within a sample cell. The distance from the transition arrival to the trailing edge of the current sample cell is calculated by subtractor 402 by subtracting the input detector pulse arrival time from "1" (i.e., "1−x") and the result is stored in register 404 (REG2 (0:6)). The negative transition signal (DETNTR) and the positive transition signal (DETPTR) are both ORed in ORgate 406 and are individually input into registers 408 and 410, respectively. A detected transition, either a negative or positive, is latched in register 412. Also, the output of ORgate 406 controls multiplexer 414, which outputs "+1" when a transition is not detected on the read channel data output and the DETPAT is output when a detected transition occurs. The output from multiplexer 414 is summed with the output from multiplexer 416 in accumulator 418. This accumulated value is stored in summation register 420 (REG1(0:9)), which outputs the summation signal SUMIN (0:9).

As will now be appreciated, a mark is measured by subtracting the PAT of the positive transition from one in subtractor 402, which is the distance from the transition arrival to the trailing edge of the sample cell, and storing this distance in register 404 during a first sample cell period. The positive transition is stored in register 412. In the next sample cell (SC3), register 412 outputs the bit, which sets multiplexer 416 to select the calculated period as the output from register 404. This period is added to the output from multiplexer 414 in adder 418 and the sum value is stored in register 420. Because this summation is performed a cycle after receiving the DETPTR, the output of ORgate 406 is zero and multiplexer 414 is set to output "+1". With each additional sample cell in which a transition is not detected by ORgate 406, adder 418 will sum the output of register 420 through multiplexer 416 with a value of "1" output from multiplexer 414, thereby incrementing the accumulated value stored in register 420. Finally, when a negative transition arrives, as indicated by DETNTR, the pulse arrival time is set as the output of multiplexer 414 so the DETPAT output from multiplexer 414 is summed with the accumulated value stored in register 420 output from multiplexer 416 in adder 418. The final accumulated result showing the mark's length is stored in register 420 and output as SUMIN (0:9).

During each sample cell, the output of length measurement circuitry 308 is input into distance qualification circuitry 310, 312 to determine if a measured mark length is a valid measurement to be summed by summation logic 304. After receiving the transition events DETNTR and DETPTR, they are input into registers 408 and 410, respectively. Register 408 produces a positive signal output to ANDgate 430 one sample cell cycle after a negative transition has been received and the final accumulated mark length has been stored in register 420. As can be seen in FIG. 4, SUMIN is input at comparators 422–428. Comparator 422 outputs a positive signal to ANDgate 430 if the input value SUMIN is greater than a programmed minimum value (MIN1), and comparator 424 outputs a positive value to ANDgate 430 when the summation signal SUMIN is less than a programmed maximum value (MAX1). Assuming that an overflow condition is not indicated by the OVERFLOW signal, ANDgate 430 outputs a qualification signal (QUAL1IN) when the mark length measurement accumulated in register 420 falls within a qualification window set by MIN1 and MAX1 (i.e., MIN1<mark measurement<MAX1) one cycle after receiving the negative transition signal. A valid qualification signal QUAL1IN allows the mark measurement SUMIN to be summed and counted in the first set of summation registers 320, 332 as a qualified mark measurement.

A space measurement begins with the arrival of a detected negative transition (DETNTR). The distance from the transition arrival to the trailing edge of the sample cell is calculated by subtractor 402 and stored in register 404 during the sample cell that the transition is received. The negative transition bit is also ORed in ORgate 406 and stored in register 412 to control multiplexer 416. (The bit also sets multiplexer 414 to output DETPAT for the final summed value of the mark length measurement occurring simultaneously and that is ending in the next sample cell.) With the arrival of the next sample cell, a transition is not output from ORgate 406 so multiplexer 414 outputs the "+1" value, and, also, the binary 1 stored in register 412 during the previous cycle sets the output of multiplexer 416 to the distance value in register 404. These multiplexed outputs are summed by adder 418. With each additional sample cell, a 1 is added to the accumulated value stored in register 420 until a positive transition is detected. The arrival of a positive transition bit output from ORgate 406 sets the output of multiplexer 414 to DETPAT, which is summed in adder 418 with the output of register 420 (SUMIN) through multiplexer 416, resulting in a final space measurement that is stored in register 420.

This resulting space length is compared to programmed minimum and maximum values in comparators 426 and 428, respectively. If the space measurement is greater than a minimum value (MIN2) and less than a maximum value (MAX2), then comparators 426 and 428 will output a positive signal. In the next sample cell after register 410 stores a positive transition bit (DETPTR), when the total space length measurement is output from register 420, the qualification of the accumulated value in register 420 is performed at ANDgate 432. Assuming no overflow is indicated by the OVERFLOW signal, ANDgate 432 outputs a qualification signal (QUAL2IN) indicating that this space measurement is a valid measurement and that the summed value is qualified to be summed and counted in the second set of summation registers 318, 330 in the summation logic.

As will be appreciated, because the event processing and qualification circuitry for the mark/space measurement can perform a summation of both the marks and spaces simultaneously, and because both the sum of all valid mark lengths and the sum of all valid space lengths are summed in separate registers and with separate qualification windows being applied to each set of measurements, the measurements and qualification for Mark/Space lengths are performed in parallel using shared hardware and can be performed on a single read-pass over the calibration area of an optical disk. This allows both measurements to be performed in a one calibration cycle, instead of two. Thus, the present invention substantially reduces the duplication of calibration circuitry and the time required to perform a Mark/Space length measurement for calibrating the optical disk drive.

Figure 6:
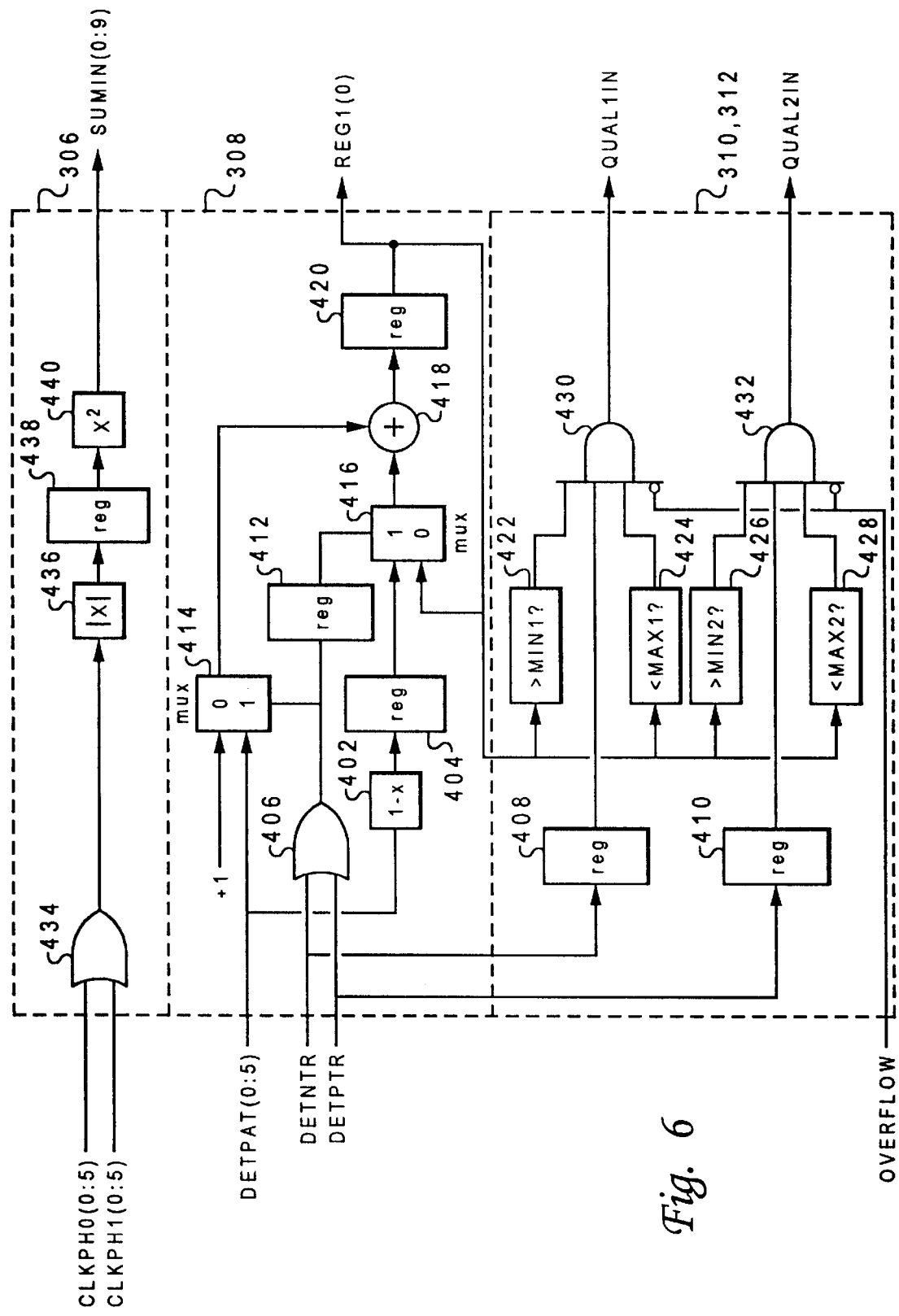
FIG. 6 shows a schematic block diagram of the event processing and qualification circuitry configured for performing a phase-error jitter measurement, in accordance with a preferred embodiment of the present invention.

With respect now to FIG. 6, there is shown a schematic block diagram of the event processing and qualification circuitry for performing a phase-error jitter measurement to allow a SNR calculation of the optical disk drive. A SNR calculation would typically be required in calibrating the read channel and all write methodologies. The length measurement circuitry 308 and the qualification circuitry 310, 312 are configured as they were for the Space/Mark measurement to indicate (with QUAL1IN, QUAL2IN) when a valid measurement is taken for the phase/error jitter of a particular type of signal or tone. Since the clock phase error signals never occur simultaneously, the clock phase error for a positive transition (CLKPH0(0:5)) and the clock phase error for a negative transition (CLKPH1(0:5)) are both input as events into ORgate 434 within event processing 306. As will be appreciated by those skilled in the art, these phase-error measurements indicate the phase difference in detected transitions.

The absolute value of the phase error received at ORgate 434 is derived at block 436, and the resulting absolute value is stored in register 438. In the next clock cycle, the contents of register 438 are input into block 440, which squares ($x^2$) the phase error value and outputs the result as SUMIN(0:9). The programmable values placed in comparators 422–428 allow for two different ranges of length measurements so that the jitter associated with two different lengths (of marks or spaces as selected) is measured by accumulating the phase-error squared into the summation logic for those two different lengths. The number of qualified measurements for a first length as indicated by negative transitions are stored and summed in CALCNT1, and the number of qualified measurements summed for a second length as indicated by positive transitions is stored and summed in CALCNT2. The sum of the phase-error squared is stored in CALSUM1 for negative transitions and CALSUM2 for positive transitions. From these values, the variance of the phase-error for both the positive transition and the negative transitions can be calculated (assuming that the average phase-error is zero) as follows:

$$\sigma^2 = \frac{\sum_{i=1}^{n} x_n^2}{n}$$

where n is the count in CALCNT1 for negative transitions and n is the count CALCNT2 for positive transitions, and the $$\sum_{i=1}^{n} x_n^2$$

component is stored in CALSUM1 for the negative transitions and in CALSUM2 for the positive transitions. From this, the calibration apparatus using calibration controller 334 or disk drive controller 140 can estimate the SNR of the optical disk drive in its current write mode by the following equation:

$$SNR_j = 20 \log_{10} \frac{1}{2\sigma}$$

Figure 7:
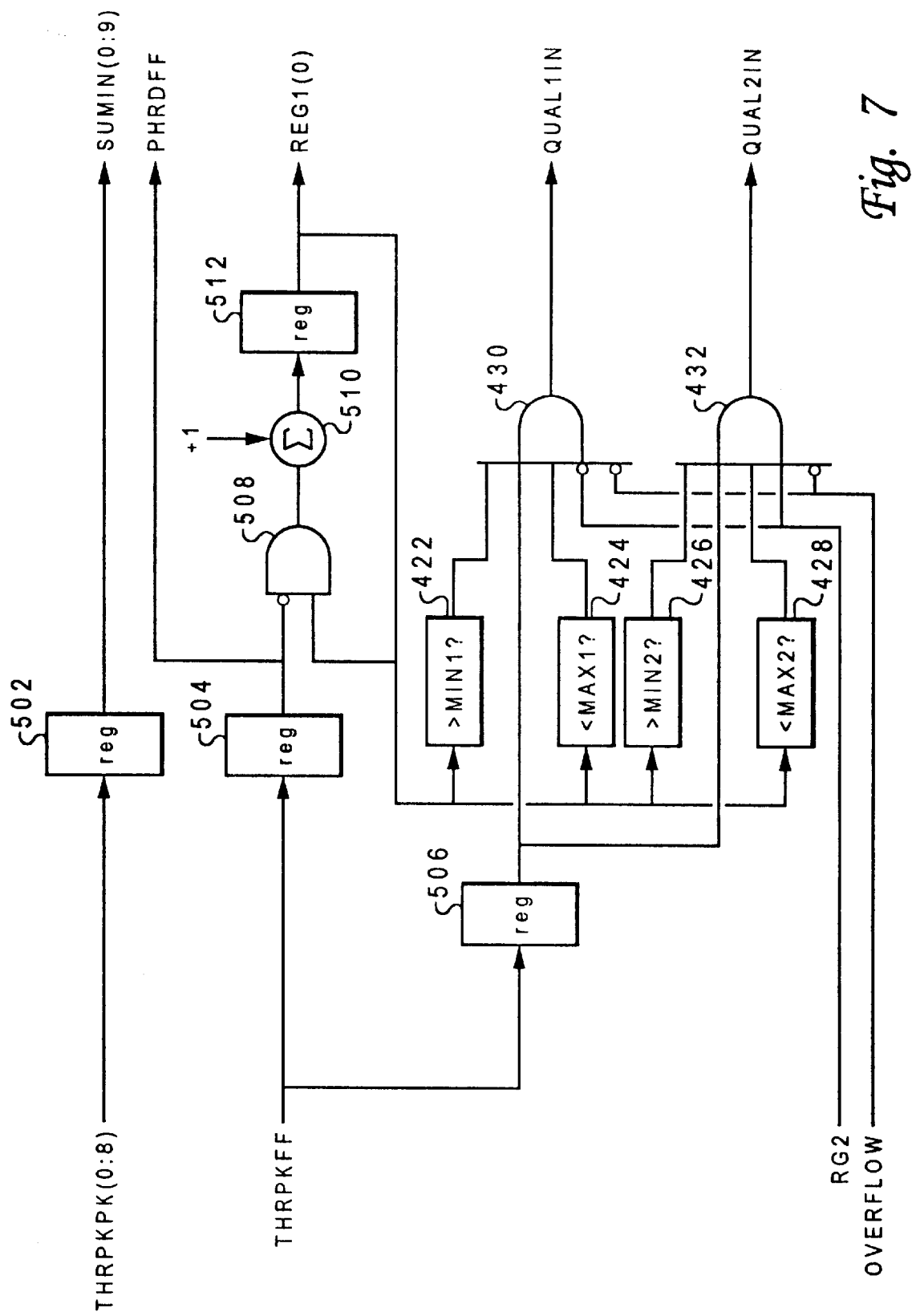
FIG. 7 shows a schematic block diagram of the event processing and qualification circuitry configured for a peak-to-peak amplitude measurement, in accordance with a preferred embodiment of the present invention.

Referring now to FIG. 7, there is shown a schematic block diagram of the event processing and qualification circuitry for a peak-to-peak amplitude measurement, in accordance with a preferred embodiment of the present invention. This mode of calibration is designed primarily for PPM channels where an average peak-to-peak amplitude estimate is required in the ID field and in the data field. Amplitude measurements are collected within the data field when ReadGate2 (RG2) is active, and measurements are collected within the ID field when RG2 is inactive or attributed to the ID field. As will be appreciated, a single peak-to-peak amplitude measurement is performed by the tracking threshold logic in the digital read detection channel 200, and is sent as an event (THRPKPK(0:8)), in conjunction with a bit (THRPKFF) signifying a peak-to-peak measurement has been made. If the distance between two peak measurements is within a length qualification window (quantized to sample cells) programmed into comparators 422–428, then the peak-to-peak amplitude value is considered valid and is accumulated in the summation logic 304 to be used in an average peak-to-peak calculation.

During ID field processing, the peak-to-peak values are accumulated in the first set of summation registers, and, during data field processing, the results are accumulated in the second set of summation registers. The THRPKFF signal, stored in registers 504 and 506, indicates that the value THRPKPK stored in register 502 represents a new peak-to-peak amplitude measurement. On the next clock cycle, this bit is output from register 504 and is inverted at the input of ANDgate 508 so that only a "1" is summed by adder 510 and stored in register 512. On succeeding clock cycles, the output of register 504 is zero, allowing ANDgate 508 to output its input from register 512 to adder 510. The sum stored in register 512 is incremented by one at adder 510 and again stored in register 512. This value continues to increment until the next measured peak-to-peak amplitude arrives, as indicated by the bit at the input of register 504. On the next cycle, when register 504 outputs the THRPKFF bit and disables ANDgate 508, the measured distance between peaks stored in register 512 is compared in comparators 422–428 and the results output to ANDgates 430, 432. The simultaneous output of the bit from register 506 enables the output of one or the other of the ANDgates 430, 432, as a function of the RG2 signal (assuming no OVERFLOW condition exists). If the distance between the peaks is determined to be within the length qualification window defined by the comparators 422–428 (and quantized to sample cell distance), then the qualification signal QUAL1IN or QUAL2IN is output to summation logic 304, allowing the measured peak-to-peak amplitudes to be accumulated for both the ID data and data field concurrently.

Figure 8:
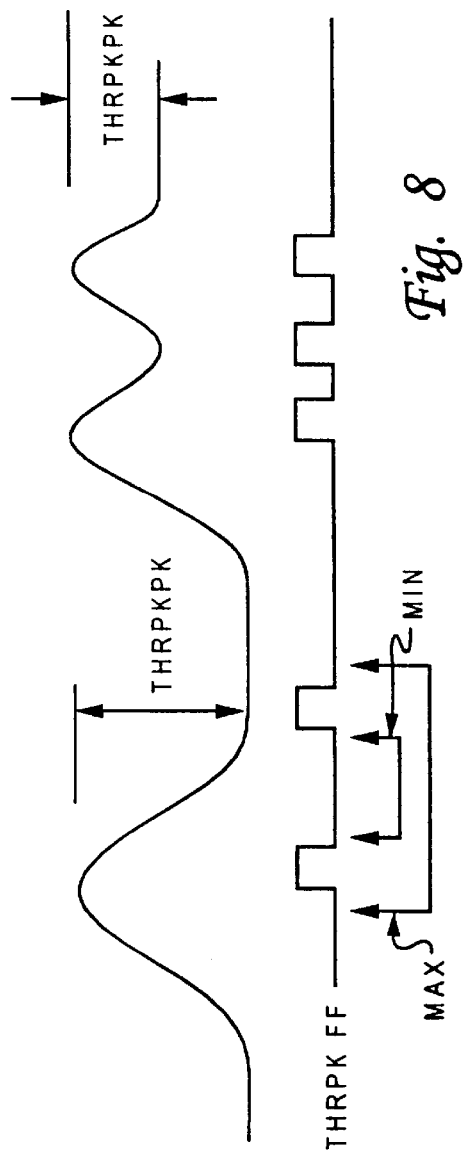
FIG. 8 shows a example of the peak-to-peak amplitude measurements performed by the event processing and qualification circuitry, in accordance with a preferred embodiment of the present invention.

The peak-to-peak amplitude measurements performed by the event processing and qualification circuitry 302 can best be understood with reference to the example readback data waveform shown in FIG. 8. The threshold peak-to-peak amplitude (THRPKPK) is measured for each succeeding peak in the readback signal. Each measurement is identified by the THRPKFF signal. The distance between each THRPKFF signal is measured and compared against a minimum (MIN) window and maximum (MAX) window of distances. If the peak-to-peak distance falls within the windows, the threshold peak-to-peak measurement is accumulated in the summation logic so that an average peak-to-peak amplitude measurement can be performed by the calibration apparatus.

Figure 9:
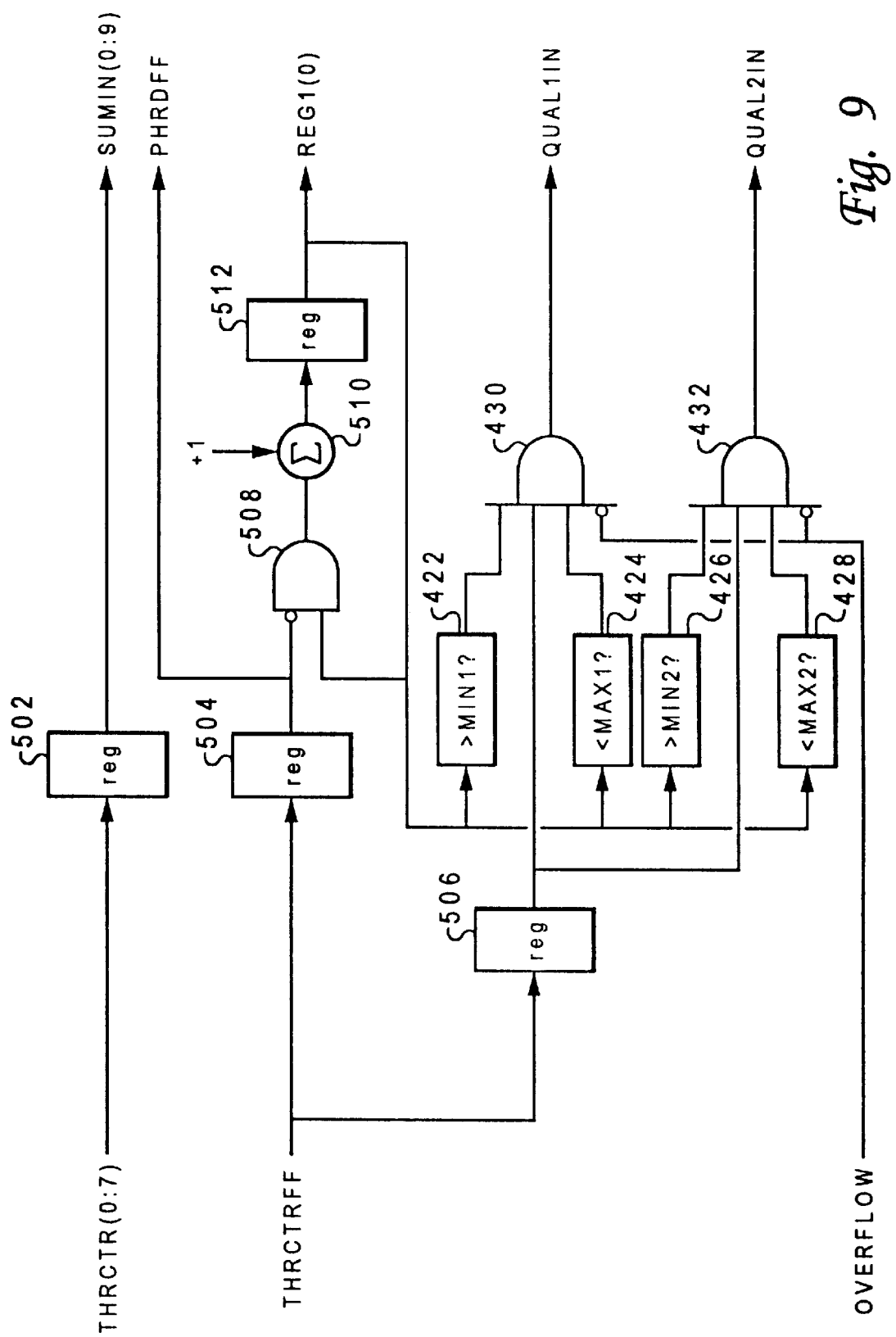
FIG. 9 shows a schematic block diagram of the event processing and qualification circuitry configured for a threshold measurement, in accordance with a preferred embodiment of the present invention.

With reference now to FIG. 9, there is shown a schematic block diagram of the event processing and qualification circuitry configured for a tracking threshold measurement, in accordance with a preferred embodiment of the present invention. A threshold calibration is performed to determine the average value of the tracking threshold for two different patterns—for example, a 2T tone and a 8T tone. A 2T tone is a short wavelength data pattern written to the optical disk having a length equal to two sample cells. An 8T tone is a long wavelength data signal produced by a data pattern having data transitions that are 8 sample cells apart. The circuit uses the same hardware as the peak-to-peak amplitude measurement of FIG. 7 and operates in an identical manner. However, the qualification windows stored in comparators 422–428 are for each of the two test patterns (i.e. one window for each of 2T and 8T). Also, the input events are a tracking threshold measurement (THRCTR(0:7)) and a tracking threshold measurement valid bit (THRCTRFF), which indicates when the measurement is valid at register 502, that both are received from the tracking threshold circuit 234.

If the timing qualification is met for the short wavelength (i.e., the distance between tracking threshold measurements is 2T as is determined by counting sample cells between THRCTRFF signals with devices 504–512 and comparison with the qualification window at devices 422, 424, 430), the associated tracking threshold measurement (THRCTR(0:7)) stored in register 502 is summed into one of the summing registers in summation logic 304. If the timing qualification is met for the long wavelength (i.e., the number of sample cells between threshold measurements is 8T as is determined by counting sample cells between THRCTRFF signals with devices 504–512 and comparison with the qualification window at devices 426, 428, 432), the tracking threshold measurement stored in register 502 is summed into the other summation register in summation logic 304. The calibration apparatus can then perform a threshold calibration by calculating the average tracking threshold value in the short wavelength pattern and the average tracking threshold value in the long wavelength pattern from the accumulated sums and counts in the summation logic 304. As can be seen, the operation of the event processing and qualification logic is substantially identical to that of the peak-to-peak amplitude measurement, except that tracking threshold measurements are summed in the summation logic.

Figure 10:
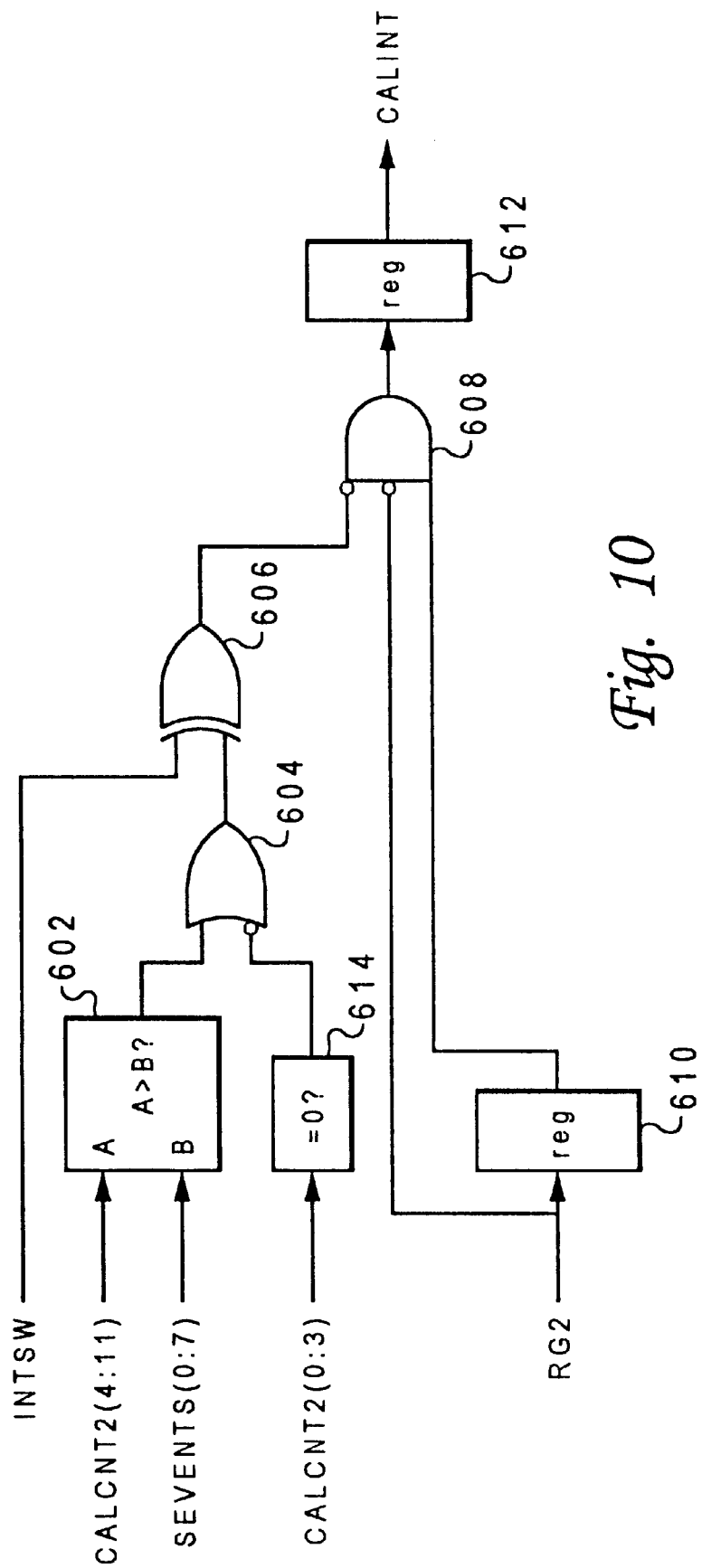
FIG. 10 shows a schematic block diagram of the medium scan, in accordance with a preferred embodiment of the present invention.

In another aspect of the preferred embodiment of the present invention, a medium scan function can be performed from the results of calibration, usually amplitude calibration measurements, to determine if the disk loaded in the drive has been written with data. This is particularly useful in WORM types of media where the drive must determine the first available unwritten sector so that new data may be written to the disk. The medium scan circuitry shown in FIG. 10 is programmable to selectively generate an interrupt to the processor either if a sector of the disk being currently read is written or, alternatively, unwritten. The number of events processed in the CALCNT2 register (usually amplitude calibration mode) is compared in comparator 602 to a fixed threshold (SEVENTS) set by calibration controller 334. If the upper bits of the count (CALCNT2 (0:3) are equal to zero as determined by comparator 614, and comparator 602 determines that the lower bits of the count (CALCNT2 (4:11)) are less than the fixed threshold, the value in the counter at the end of the read operation is less than the fixed threshold and the sector being read has not been written. The results are output to ORgate 604 (the result of 614 is inverted) and into XORgate 606.

The input INTSW from calibration controller 334 sets the logic of the processor interrupt such that if the sector is written and INTSW equals 1, or if the sector is not written and INTSW equals 0, then an interrupt will be generated. The output of XORgate 606 is inverted and input into ANDgate 608. The RG2 signal is also inverted and input into 608, along with the previous RG2 signal stored in register 610 from the previous sample cell. It will be appreciated that this logic assures that the medium scan measurement is derived from an amplitude measurement of a data field and not an ID field. The resulting medium scan interrupt (CALINT) is latched in register 612 to be output to the processor.

The calibration apparatus of the present invention is extremely flexible in allowing programmable amplitude measurements, threshold measurements, jitter measurements, or Mark/Space length measurements to be performed as required for a current read or write mode of a multi-mode information storage and retrieval system (i.e. optical disk drive, etc.). The calibration circuit performs the appropriate parametric measurements of the read characteristics of the multi-mode drive for its current write mode, and, in any one of many methods well known in the art, the calibration apparatus can then calibrate the multi-mode drive based on these measurements to optimize the read and/or write processes to reliably read and write data in the current operating mode. Also, the calibration apparatus of the present invention allows the SNR of the optical drive/optical media combination to be measured to further enhance the recovery of data from the multi-mode drive.

In summary, because the calibration apparatus of the present invention can be easily programmed for a plurality of measurement configurations to provide measured data for multiple calibration modes, any type of read or write mode or drive/media combination that is configured for the optical disk drive can be calibrated by selectively measuring the appropriate parameters for the particular write mode and drive/media combination. The calibration apparatus integrates multiple calibration devices in a single device that shares common hardware to provide the multiple calibrations without adding a significant amount of circuitry, consuming large amounts of power, or substantially increasing the cost of the optical disk drive. Also, the measurement of multiple parameters can be performed in a single calibration cycle for selected parameters, decreasing the cost and increasing the speed of calibration for a multi-mode optical disk drive. While the invention has been particularly shown and described with reference to a preferred embodiment, it will be understood by those skilled in the art that various changes in form and detail may be made therein without departing from the spirit and scope of the invention.

What is claimed is:

1. A calibration apparatus for a multi-mode drive that writes data to an information media in any selected one of a plurality of write modes and that reads readback data from the information media written in any of the plurality of write modes, the calibration apparatus comprising:

a configurable event processing and measurement circuit that has a plurality of diverse configurations that each correspond to a different measurement, wherein each measurement measures a selected one or more of a plurality of possible parameters from readback data such that the parameters measured will provide information for calibration of the multi-mode drive operating in a particular one of the plurality of write modes that was used to write the readback data, each of the plurality of write modes corresponding to a different method of encoding data on said information media; and a summation circuit that sums measurements of selected parameters measured by the event processing and measurement circuit and counts the number of measurements summed for each of said selected parameters.

2. A calibration apparatus according to claim 1, wherein the event processing and measurement circuit concurrently measures at least two parameters among the plurality of parameters from the same readback data.

3. A calibration apparatus according to claim 1, and further comprising a write device that writes a data pattern on the information media in any one of the plurality of write modes, and a read device that reads the test pattern to retrieve readback data from the information media, wherein the readback data includes one or more events from which a parameter is measured.

4. A calibration apparatus according to claim 3, wherein the plurality of write modes includes at least a first mode in which data is written to said information media utilizing pulse-width modulation and a second mode in which data is written to said information media utilizing pulse-position modulation.

5. A calibration apparatus according to claim 1, wherein the event processing and measurement circuit includes a qualification circuit that compares a measured parameter against a qualification window, and wherein the summation circuit only selects measurements that are within the qualification window to be summed.

6. A calibration apparatus according to claim 5, wherein the qualification circuit compares a first measured parameter against a first qualification window and compares a second measured parameter against a second qualification window.

7. A calibration apparatus according to claim 1, wherein the event processing and measurement circuit concurrently measures a mark parameter and a space parameter utilizing the same readback data.

8. A calibration apparatus according to claim 1, wherein the event processing and measurement circuit measures a peak-to-peak amplitude parameter.

9. A calibration apparatus according to claim 1, wherein the event processing and measurement circuit measures a phase-error parameter.

10. A calibration apparatus according to claim 1, wherein the event processing and measurement circuit measures a tracking threshold parameter.

11. An optical disk drive that writes in multiple modes, said optical disk drive comprising:

an optical data storage medium;

a write device capable of writing a test pattern on the optical data storage medium in any one of a plurality of write modes, each of said plurality of write modes corresponding to a different method of encoding data on said optical data storage medium;

a read device that reads the test pattern to retrieve readback data from the optical data storage medium, wherein the readback data includes a plurality of events;

a configurable event processing and measurement circuit that has a plurality of diverse configurations that each correspond to a different measurement, wherein each measurement measures a selected one or more of a plurality of possible parameters from readback data such that the parameters measured will provide information for calibration of the optical disk drive operating in a particular one of the plurality of write modes that was used to write the readback data; and a summation circuit that sums measurements of selected parameters measured by the event processing circuit and counts the number of measurements summed for each parameter.

12. An optical disk drive according to claim 11, wherein the event processing and measurement circuit includes a qualification circuit that compares the measured parameters against a qualification window, and only measurements that are within the qualification window are selected as measurements that are summed by the summation circuitry.

13. An optical disk drive according to claim 11, wherein the event processing and measurement circuit concurrently measures a mark parameter and a space parameter utilizing the same readback data.

14. An optical disk drive according to claim 11, wherein the event processing and measurement circuit measures a peak-to-peak parameter.

15. An optical disk drive according to claim 11, wherein the event processing and measurement circuit measures a phase-error parameter.

16. An optical disk drive according to claim 11, wherein the event processing and measurement circuit measures a tracking threshold parameter.

17. An optical disk drive according to claim 11, wherein the event processing and measurement circuit performs a medium scan function.

18. An optical disk drive according to claim 11, wherein the event processing and measurement circuit measures phase-error jitter.

19. An optical disk drive according to claim 11, wherein the plurality of write modes includes at least a first mode in which data is written to said information media utilizing pulse-width modulation and a second mode in which data is written to said information media utilizing pulse-position modulation.

* * * * *

UNITED STATES PATENT AND TRADEMARK OFFICE
CERTIFICATE OF CORRECTION

PATENT NO. : 5,978,335
DATED : Nov. 2, 1999
INVENTOR(S) : Clark et al.

It is certified that error appears in the above-identified patent and that said Letters Patent is hereby corrected as shown below:

On the title page after the *Primary Examiner*, please add the following:

*Attorney, Agent, or Firm*--Robert M. Sullivan; Brian F. Russell; Andrew J. Dillon Signed and Sealed this Twelfth Day of December, 2000

Attest:

Q. TODD DICKINSON

*Attesting Officer*    *Director of Patents and Trademarks*

UNITED STATES PATENT AND TRADEMARK OFFICE
CERTIFICATE OF CORRECTION

PATENT NO. : 5,978,335  
DATED : November 2, 1999  
INVENTOR(S) : Clark et al.

Page 1 of 1

It is certified that error appears in the above-identified patent and that said Letters Patent is hereby corrected as shown below:

Title page,
Insert -- Assignee: International Business Machines Corporation, Armonk, N.Y. --

Signed and Sealed this

Second Day of October, 2001

Attest:

NICHOLAS P. GODICI  
*Attesting Officer*    *Acting Director of the United States Patent and Trademark Office*